UNITED STATES PATENT OFFICE 2,797,253
Patented June 25, 1957

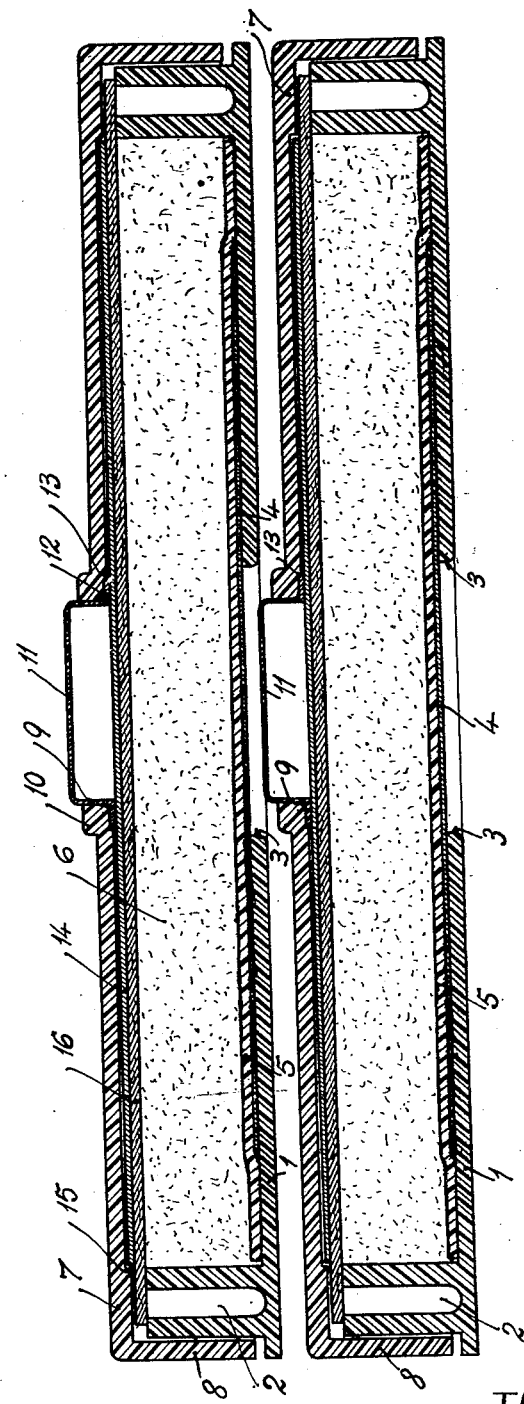

2,797,253

ELECTRIC BATTERY OF THE FLAT CELL TYPE

Jacques Paul Courtecuisse, Neuilly-sur-Seine, France, assignor to Les Piles Wonder, Saint-Ouen, France, a French company Application March 1, 1955, Serial No. 491,413

Claims priority, application France March 2, 1954

4 Claims. (Cl. 136—111)

The present invention has for its object improvements in electric dry batteries of the flat cell type chiefly in those employing manganese dioxide as a depolarizer.

Flat cell electric dry batteries have already been instructed in various manners, but the embodiments known hitherto have various drawbacks. Some of them lead to giving the cell a very high internal resistance so that the batteries obtained are incapable of ensuring the high output current required for portable lanterns or the like purposes. Other embodiments must be sold at a very high cost price, or else cannot be kept for a sufficient time or again they allow the electrolyte to leak out of the cell under the action of a heavy discharge.

The present invention allows avoiding the above drawbacks and producing more particularly for use in portable illuminating devices a dry cell having a low cost price, the internal resistance of which is comparable for an equal volume with that of an elongated cylindrical cell while providing an excellent hermetic tightness for fluids.

According to the present invention, the battery cell is constituted by a case, preferably of plastic material, including a body or cup containing the positive electrode and a depolarizing mass and a cap cover fitted hermetically over said body and carrying the electrolyte and the negative electrode, the body or cup and the cover of said case being both provided with central apertures which are closed hermetically by metal connecting terminal elements which are respectively in contacting relationship with the positive and negative electrodes and collect the current.

In a preferred embodiment of the present invention, the metal terminal element closing the central apertures in the body or cup of the case is constituted preferably by a small metal plate engaging the bottom of the cup or body, this plate being entirely covered by a sheet of carbonaceous material the surface of which is of larger dimension than that of said plate and which forms the positive electrode over which the depolarizing mass is compressed. The metal terminal element closing the central aperture in the cover is advantageously constituted by a cap fitted tightly inside a rabbet recess formed in the inner surface of the cover, while a zinc plate forming the negative electrode is applied against the inner edge of this metal cap and is entirely covered by a sheet of paper impregnated by the electrolyte and the size of which is larger than that of said zinc plate.

According to a still further feature of the invention, there is provided along the lateral periphery of the case body or cup, a grooved wall structure forming an expansion chamber adapted to collect the excess electrolyte in the case of a heavy discharge at a high rate.

Further advantages and features of the present invention will apepar from the following description, reference being made to the accompanying drawing given by way of an example and by no means in a limiting sense.

The single figure of the drawing shows in cross section a battery constructed in accordance with the present invention.

In the embodiment illustrated by way of example, each cell has a circular shape and includes a case body or cup 1 the side wall of which is divided by a deep groove 2 into two parallel side wall sections while the bottom of the cup is provided with a circular opening 3; said cup is advantageously made of a molded thermoplastic material.

Over the bottom of this cup is laid a thin metal disc 4 the diameter of which is smaller than the inner diameter of the cup while it is larger than that of the opening 3 in the bottom, which opening is thus always covered. This disc serves as a current collecting element.

The positive electrode 5 is positioned over the disc 4 and it is constituted by a disc cut out of a carbonaceous sheet and the diameter of which is larger than that of the disc 4. The disc 4 may ordinarily be constituted of an inert binder material, such as vinyl chloride with a suitable plastifier or of synthetic rubber, intimately mixed with graphite. This carbonaceous sheet should be impervious to the electrolyte. Said disc 5 is yielding so that it may adhere perfectly both to the disc 4 and to the depolarizing mass overlying it.

Over the positive electrode 5 lies the depolarizing mass 6, constituted by agglomerated material which may be prepared beforehand. In a particularly advantageous embodiment of the present invention, this agglomerate is compressed directly inside the cup so as to fill the latter up to the upper edge of the double side wall containing groove 2 of the case body.

This embodiment provides an intimate contact between the depolarizing mass 6 and the positive electrode 5 and it has furthermore for its advantage, as illustrated in the drawing to provide a tight clamping under considerable pressure of the periphery of the electrode 5 over the bottom of the cup whereby a fluid tight joint is ensured which prevents any leaking of the anolyte from 5 towards the metal disc 4 and the central opening 3 in the cup.

This forms the first section of a battery cell according to the present invention.

The second section of the cell here disclosed includes a cover 7 which is also constituted preferably of thermoplastic material and the depending flange peripheral edge of which 8 has an inner diameter which matches the outer diameter of the cup 1 so that this cover makes a frictional fit over the side wall of the latter. The depending flange or side wall 8 of the cover has a depth approximating the height of the peripheral side wall of the cup.

There is provided in cover 7 a central opening 9 the periphery of which is advantageously constituted by a projecting bead 10, the outer diameter of said projection being slightly less than the diameter of the opening 3 in the cup bottom for a purpose which will appear hereinafter.

Inside this opening 9 in the cover is housed the negative connecting terminal 11 constituted by a stamped metal part or cap the outer outwardly extending flange 12 of which is fitted inside a rabbet recess 13 formed in the cover along the inside of the bead 10. The stamped metal part considered has a height such that it projects slightly above the bead 10.

Underneath the negative connecting terminal 11 is fitted a zinc disc 14 forming the negative electrode and engaging a corresponding recess 15 formed in the lower surface of the cover. Lastly the zinc disc 14 carries on its outer surface a sheet 6 of paper adapted to swell, which sheet is cut substantially to match the inner diameter of the cover and which is immersed in an electrolyte before it is positioned over the zinc disc 14.

As illustrated in the drawing, the diameter of this paper sheet 16 is larger than that of the zinc disc 14. Its diameter is thus such that no direct contact is possible between the anode and the cathode, which leads to complete reliability in operation. The sheet 16 extends over both sections of the side wall of cup 1 so that any excess electrolyte in 16 will drop into groove 2.

When the negative terminal 11, the zinc disc 14 and the paper disc 16 impregnated with the electrolyte have thus been laid inside the cover 7, the latter has merely to be fitted over the outside of the cup after the cooperating side walls of the cup and cover have been coated with adhesive solvent. Since the fitting is performed with a slight force fit it is possible to obtain through a suitable selection of the solvent perfect adherence between the cover and the cup, and consequently complete hermetic tightness for fluid.

The cell, being thus constituted with a double wall having groove 2 providing an expansion chamber for the electrolyte, is completely enclosed inside thermoplastic material and only the central section of the disc 4 and the circular projection of the negative terminal 11 can be seen.

For building up a battery, it is sufficient as illustrated to superpose two or more cells, the negative terminal of each lower cell entering automatically into contacting relationship with the current-collecting disc 4 of the next succeeding upper cell which is in its turn in contacting relationship with the positive electrode 5, the bead 10 of the lower cell entering the opening 3 in the cup bottom of the cup of the next cell. It is thus sufficient for the negative terminal 11 to project only very slightly beyond the said bead for such an operative interconnection of the cells to be possible.

As is apparent from the drawing, it is quite impossible for a mistake to be made at the moment of the interengagement of the cells by reason of the particular shape given to the latter.

Obviously the embodiment described is only given by way of example and many modifications may be made therein. The cells may for instance alternatively be given any desired square, rectangular or the like shape.

What I claim is:

1. Flat element for an electric pile, comprising a cup of insulating material with double side wall, a cap cover of insulating material exactly fitting tightly by its flange edges over the double flanged wall of the said cup, in the bottom of this latter a central hole closed by a large sheet of metal serving as a current collector, covering a flexible sheet forming the positive electrode and occupying the inside bottom of the said cup against which it adheres perfectly and in tight manner by its edges going beyond the edges of the said current collector, above the said positive electrode a depolarising mass compressed in the said cup, in the bottom of the said cap cover of the said cup a central hole, a metallic terminal forcibly and tightly fitted in the said central hole projecting outwardly and forming the negative terminal in interior contact with a large sheet of zinc forming the negative electrode applied in the bottom of the said cap cover, a paper sheet impregnated with electrolyte and of greater diameter than the said negative electrode, between said negative electrode and the said depolarising mass, and resting by its edges directly between the double side wall of the said cup and the cover of the latter.

2. A flat element for an electric pile battery, comprising a cup of insulating material with double side wall, a cap cover of insulating material fitting tightly by its flange edges over the double flanged side wall of the said cup, in the bottom of this latter a central hole closed by a alrge metal sheet serving as a current collector, covering a flexible sheet forming the positive electrode and occupying the inside bottom of the said cup against which it adheres perfectly and tightly by its edges which extend beyond the edges of the said current collector, above the said positive electrode a depolarising mass compressed in the said cup, in the bottom of the said cap cover of the said cup a central hole, a metallic terminal fitted forcibly and tightly in the said central hole and projecting to the outside and forming the negative terminal in interior contact with a large sheet of zinc forming the negative electrode mounted in a recess of the said cap cover, a thin disc paper sheet mounted between the said negative electrode and the said depolarising mass and being impregnated with electrolyte and being of larger dimension than the said negative electrode and resting by its edges directly between the double side wall of the said cup and the cover of this latter.

3. In a flat dry battery cell, a cup of insulating material having a double peripheral wall comprising an intervening groove, the bottom of said cup being centrally apertured, a cap cover having a peripheral flange adapted to tightly fit over the peripheral wall of said cup, said cap cover being centrally apertured, a terminal sheet of metal positioned in the bottom of said cup and extending beyond the edges of the aperture in the bottom of said cup, a flexible carbonaceous sheet constituting the positive electrode positioned over said metal sheet and, extending beyond the edges of said metal sheet and adhering tightly to said metal sheet and the bottom of said cup, and occupying substantially all of the bottom of said cup, a depolarising mass mounted and compressed in said cup adjacent said carbonaceous sheet, a flanged metallic terminal stud fitted tightly into the aperture in said cap cover and having a head projecting outside of cap cover, a flat zinc plate constituting the negative electrode extending across a substantial portion of the flat inside surface of said cap cover and engaging said terminal stud, and an electrolyte impregnated sheet of battery paper positioned in said cap cover adjacent said zinc plate and extending beyond the edges of said zinc plate, said sheet of battery paper engaging said depolarising mass when said cap cover is assembled on said cup.

4. A cell according to claim 3, said sheet of battery paper extending over both portions of the double peripheral wall of said cup and its groove, and being tightly squeezed between said cap cover and said portions of said wall, and said groove forming an expansion chamber for surplus electrolyte forced out of said battery paper sheet.

References Cited in the file of this patent

UNITED STATES PATENTS

| 2,475,152 | Rock | July 5, 1949 |
| 2,487,985 | Ruben | Nov. 15, 1949 |
| 2,591,355 | Heraud | Apr. 1, 1952 |
| 2,632,781 | Woodring | Mar. 24, 1953 |